3,023,241
PREPARATION OF ACYL HYDRAZINE DERIVATIVES

Robert D. Twelves, Northford, Conn., assignor to Olin Mathieson Chemical Corporation, a corporation of Virginia
No Drawing. Filed Dec. 26, 1957, Ser. No. 705,098
2 Claims. (Cl. 260—561)

This invention relates to the preparation of hydrazine derivatives and more particularly, to the preparation of aliphatic acylhydrazides, especially of formylhydrazide.

These hydrazine derivatives have a variety of uses in the arts, particularly as versatile chemical intermediates and in compositions displaying biological activity and capable of fulfilling other industrial purposes. They have generally been prepared in the past by reacting an ester with hydrazine, a reaction characterized by rather poor yields and thus, expensive products.

The principal object of this invention has been the provision of a rapid process for securing high yields of formylhydrazide and other aliphatic acylhydrazides. Other objects include the provision of such a process that is readily controllable to yield products of good purity. Further objects will be apparent from the following detailed description.

These objects have been accomplished by reacting hydrazine and an amide for at least an hour at a temperature within the range of 35° C. to about 120° C., in the presence or absence of a solvent, using at least one mole of hydrazine per mole of amide group intended to be replaced by hydrazide.

The aliphatic amides reacted with hydrazine in accordance with this invention may be represented by the formula R—(CONH$_2$)$_n$, where R is selected from the group consisting of hydrogen and a saturated aliphatic hydrocarbon radical, and $n$ is one when R is hydrogen and an integer less than three when R is a hydrocarbon radical. Thus, depending on the particular hydrazide desired, the amide used in the reaction may be formamide, acetamide, propionamide, butyramide, caproamide, the amides of lauric, myristic and stearic acids, adipamide, malonamide, succinamide, valeramide and caprylamide.

Amides of the above character have been found to react readily with hydrazine within the stated temperature range to result in substantially quantitative yields of the desired hydrazide. In contrast, aromatic amides and other amide derivatives have been found to be unsuitable for the preparation of hydrazides under the above conditions.

In the manufacture of the first member of the series, formylhydrazide, the reaction temperature is preferably maintained within the range of 40° to 90° C. for at least an hour, as this range enables attainment of high yields of excellent product within short reaction periods. Temperatures above about 120° C. are generally to be avoided as favoring side reactions, such as the formation of 4-aminotriazole and related compounds, which would contaminate the desired hydrazide product.

The following specific examples describe illustrative embodiments in accordance with the invention.

Example 1

FORMYLHYDRAZIDE (H—CONH.NH$_2$)

Formamide (99%) was placed in a reaction vessel provided with heating jacket, thermometer, condenser, stirrer and dropping funnel. To 180 parts by weight of formamide at room temperature, 129 parts by weight of hydrazine (99%) were added over a period of six minutes, while the mixture was stirred. An exothermic reaction started immediately and the temperature was increased to 49° C., the heat of reaction being supplemented as necessary by the heating jacket. Vacuum was then applied to the reaction mixture and the pressure was reduced gradually over a period of 1½ hours to 35 mm. of mercury, while the temperature was raised to 71° C.

On cooling to room temperature, a quantitative yield of formylhydrazide was obtained, of pink color and having a melting point of 49–51° C., containing 2% water and about ½% of ammonia.

The product was purified by recrystallization by dissolving at a proportion of 190–200 grams in 100 ml. of absolute ethyl alcohol or denatured ethanol containing 5% water and 0.5% benzene, by volume, at a temperature of 35° to 45° C. The solution was filtered and then cooled to 18° C. The colorless crystals were filtered and washed with two 50 ml. portions of alcohol. The crystallization process as above was then repeated and the colorless crystalline formylhydrazide was dried over concentrated sulfuric acid in a vacuum desiccator for 24 hours. The purified product amounted to 124 grams, displaying a melting point of 56.2° C. (literature, 54° C.).

Salts and derivatives of the product were prepared and found to correspond in analysis and properties to the corresponding derivatives and salts of formylhydrazide.

Reaction with acetone resulted in colorless needle-shaped crystals, very soluble in water and benzene, displaying a melting point of 35–35.5° C. and having the composition H.CO.NH.N=C(CH$_3$)$_2$, isopropylidene formylhydrazone.

Reaction with benzaldehyde dissolved in alcohol, followed by the addition of benzene and removal of water by distillation resulted in colorless needle-shaped crystals. After crystallization from alcohol and drying, the crystalline material had a melting point of 133° C. and corresponded in composition to H.CO.NH.N=CH.C$_6$H$_5$, formylbenzalhydrazone.

Salts were formed with sulfuric acid and hydrobromic acid by mixing in the cold an alcoholic solution of formylhydrazide with an alcoholic solution of the acid, having compositions corresponding to (H.CO.NH.NH$_2$)$_2$H$_2$SO$_4$ and (H.CO.NH.NH$_2$)HBr having melting points, respectively, of about 150° C. and 135–138° C.

Example 2

FORMYLHYDRAZIDE

This example illustrates the preparation of formylhydrazide in the presence of a substantial proportion of water, good results being obtainable when up to about 40% of water by weight is associated wtih either or both the formamide or hydrazine.

Following the procedure of Example 1, equimolar quantities of formamide, containing 1% water, were reacted with hydrazine hydrate, containing 36% water, the reaction being completed at 75° C. A substantially quantitative yield of formylhydrazide was obtained and purification was effected by crystallization as in Example 1.

Example 3

DIFORMYLHYDRAZIDE  (H.CO.NH.NH.CO.H)

Formamide, containing 1% water, was mixed at room temperature with hydrazine, containing 4.4% water, in amounts of 4 moles to two, respectively, the hydrazine being added at the rate of 5 grams per minute. After the reaction mixture was heated at 80–83° C. for 9 hours, it was cooled to 0° C., resulting in the separation of a colorless crystalline precipitate. This product was filtered, washed with ethanol and dried, and had a melting point of 158.5–159° C. (literature, 159–160° C.) corresponding in analysis and properties to diformylhydrazide.

Example 4
ACETYLHYDRAZIDE (CH₃CO.NH.NH₂)

Two moles of hydrazine, containing 4.4% water, were added over a 15 minute period to two moles of acetamide dissolved in 100 ml. of ethanol, containing 0.5% by volume of benzene, in a reaction vessel equipped with stirrer, heating jacket and reflux condenser. The reaction mixture was heated at reflux at 70°–75° C. for 10 hours.

After removal of alcohol by heating to 103° C., the mixture was cooled to 0° C. Colorless crystalline acetylhydrazide was obtained on filtration, washing and drying at 80–95% of theoretical yield. Crystallization from chloroform solution yielded a crystalline product displaying a melting point of 63–65° C.

Example 5
CAPROYLHYDRAZIDE (CH₃(CH₂)₄CO.NH.NH₂)

A mixture of 10 grams (0.09 mole) of n-caproamide and 20 ml. (0.5 mole) of hydrazine (95.4% hydrazine and balance water) was maintained at 95–98° C. for 6 hours and then cooled to room temperature. After the addition of 200 ml. of ethanol containing 0.5% benzene by volume, the mixture was cooled to 0° C. The colorless crystalline product which separated was filtered, washed three times with 25 ml. portions of alcohol and dried at 70° C. The product corresponded in analysis to caproylhydrazide, displaying a melting point of 79–81° C. and, including material recovered from the reaction mixture filtrate, was obtained at substantially the theoretical yield.

Eaxmple 6
STEAROYLHYDRAZIDE (CH₃(CH₂)₁₆CO.NH.NH₂)

A mixture of 25 g. (0.089 mole) of stearamide and 30 ml. (0.94 mole) of hydrazine as in the previous example was heated for 3 hours at 115° C. in a vessel equipped with an air-cooled condenser. After an addition of 25 ml. (0.8 mole) of the hydrazine, the heating was continued for 6 hours. Then, the mixture was poured slowly into 400 ml. of water at about 20° C. The separated crystalline product was filtered, washed four times with water and dried at 70° C. Stearoylhydrazide, having a melting point of 103–105° C. was obtained at substantialy theoretical yield.

Example 7
ADIPIC DIHYDRAZIDE (NH₂NH.CO.(CH₂)₄.CO.NH.NH₂)

A mixture of 25 grams (0.17 mole) of adipamide and 100 ml. (3.1 moles) of 99% hydrazine was maintained under reflux for 6 hours at 115° C. The mixture was cooled to room temperature and the crystalline product was filtered. The product was washed with three 100 ml. portions of ethanol and was then dried at 70° C., a quantitative yield of adipic dihydrazide being obtained, displaying a melting point of 183–184° C. (literature, 178° C.).

Example 8

Formylhydrazide was prepared in a stainless steel vessel equipped with stirrer, a heat-exchanger jacket and reflux condenser. With the vessel and communicating lines filled with nitrogen, a charge of 16.5 pounds of hydrazine, containing 97.3% hydrazine and 2.7% water, was added. After the temperature of the hydrazine was brought to 65° C., the gradual addition od 22.7 pounds of formamide, containing 99.1% formamide and 0.9% water, was started at a rate of about 0.8 pound per minute, while maintaining the reaction mixture at about 65° C. and the flow of nitrogen gas.

The reaction forming formylhydrazide proceeded during the addition of the formamide, the evolved ammonia being absorbed in 25% sulfuric acid solution circulated through a suitable absorbed attached to the outlet from the reflux condenser.

After the addition of formamide had been completed, the flow of nitrogen was stopepd and the pressure in the reaction vessel was reduced gradually by means of a vacuum pump to 25 mm. of mercury. The reaction mixture was maintained at this pressure and at a temperature of 65° C. for 50 minutes.

The formylhydrazide product was obtained at 94% of theoretical yield, having a 3% content of water and a slight pink color.

Crystallization from ethanol as described in Example 1 resulted in a colorless crystalline product, having a melting point of 56.2° C.

The above example utilizes the preferred conditions for the preparation of formylhydrazide, a reaction temperature of about 65° C. and the use of at least one mole of hydrazine per mole of formamide. An excess of hydrazine may be used and in fact, such excess is preferred when one of the higher amides is to be converted to a hydrazide.

Formylhydrazide is very hygroscopic, the saturated solution in water at 25° containing close to 80% by weight of the solute. It is also very soluble in methanol, ethanol and dimethylformamide, and fairly soluble in acetonitrile, dioxane, and cholorform. It is slightly soluble in ethyl acetate, ethyl ether, petroleum ether, benzene, and carbon tetrachloride.

Diformylhydrazide dissolves readily in water, but only slightly in ethanol. Acetylhydrazide dissolves readily in both solvents.

In contrast with the favorable reactivity of aliphatic amides with hydrazine, whereby substantially quantitative yields of aliphatic acylhydrazides are rapidly obtained in accordance with this invention, other compounds containing the amide group have been found to be substantially non-reactive with hydrazine under the specified reaction conditions to yield acylhydrazide products. Thus, there was no evidence of reaction on heating an equimolar mixture of hydrazine and dimethylformamide after refluxing for 6 hours at 115° C.

Likewise, there was no evidence of reaction after heating an equimolar mixture of hydrazine and urethane for 6 hours at 95° C. followed by 5 hours at 115° C.

An equimolar mixture of 121 grams of benzamide and 32 grams of hydrazine suspended in 250 ml. of ethanol, containing 0.5% by volume of benzene, was heated for 12 hours at 80° C. On cooling the mixture to 25° C., a very slight amount of crystalline product separated, having a melting point of 108°–110.5° C. and identified as benzoylhydrazide. The trace yield could be increased somewhat by adding an excess of 5 moles of hydrazine and heating at 108° C. for 3 hours after removal of the alcohol by distillation.

Further, there was no evidence of reaction on heating a mixture of 50 g. (0.32 mole) of benzenesulfonamide with 50.5 g. (1.57 moles) of 95.4% hydrazine under reflux at 108–110° C. for 6 hours.

The aliphatic acylhydrazides made in accordance with this invention are well adapted for various industrial uses and are particularly versatile chemical intermediates. They are effective ingredients of solder flux compositions, rust-inhibiting and anti-tarnish mixtures, and scavengers for traces of oxygen or chlorine.

The di- and trimethylol derivatives are adapted for use as creaseproofing resins for the impregnation of cotton and other cellulosic fabrics. On reaction with ethylene and/or propylene oxide, non-ionic surface-active compounds result which find utility as wetting agents and emulsifiers. The biological activity of the aliphatic acylhydrazides indicate advantageous uses as insecticides or herbicides. For example, diformylhydrazide has been The crystalline product was obtained in 55% of theoretical yield. However, substantially theoretical yield was obtained by recovery from the reaction liquid filtrate, through removal of water or precipitation by the addition of ethanol or both, of additional product.

found to display excellent herbicidal properties, destroying weeds while only slightly affecting crops.

In addition to furnishing a starting material for derivatives as described above, the aliphatic acylhydrazides are readily convertible to cyclic compounds. Thus, when formylhydrazide is heated at 150°–200° C. at atmospheric pressure, it loses water and forms 4-aminotriazole. Diformylhydrazide, when heated at about 200° C. with ammonia yields 1,2,4-triazole. Corresponding substituted triazoles result when amines replace ammonia in the above reaction. Corresponding cyclic compounds may be formed similarly from the higher acylhydrazides.

Accordingly, it will be seen that this invention provides a convenient and improved method enabling the efficient production of the exceptionally versatile aliphatic acylhydrazides.

I claim:
1. In a process for the preparation of acylhydrazides, the step of reacting at about 35° to 120° C. for at least one hour, hydrazine and an amide of the formula: $R-(CONH_2)_n$ where R is selected from the group consisting of hydrogen, monovalent and divalent saturated alkyl hydrocarbon radicals containing from one to seventeen carbon atoms and $n$ is the valence of R.
2. In a process for the preparation of formylhydrazide, the step of reacting hydrazine and formamide for at least an hour at a temperature of about 40° to 90° C.

References Cited in the file of this patent

UNITED STATES PATENTS

| | | |
|---|---|---|
| 2,744,119 | Walton | May 1, 1956 |
| 2,830,994 | Gasson | Apr. 15, 1958 |
| 2,833,764 | Baker et al. | May 6, 1958 |

FOREIGN PATENTS

| | | |
|---|---|---|
| 785,346 | Great Britain | Oct. 23, 1957 |

OTHER REFERENCES

"Die Hydrazine," Wieland, pages 180–181, pub. Ferdinand Enke, Stuttgart (1913).

Sidgwick: "The Organic Chemistry of Nitrogen," Clarendon Press (Oxford), page 398 (1937).

Sidgwick: "Organic Chemistry of Nitrogen," 1942 pages 398–9.

Galat et al.: Jour. Am. Chem. Soc., vol. 65 (1943), pages 1566–7.

Theilheimer: "Synth. Methoden der Org. Chem.," vol. 3, pp. 155, 1949.

Byrkit et al.: "Ind. and Engl. Chem.," vol. 42 (1950), pp. 1862–75.

Degering: "An Outline of Organic Nitrogen Compounds," University Lithoprinters (Ypsilanti, Michigan), page 376 (1950).

Reed: "Hydrazine and Its Derivatives," Lectures, Monographs, and Reports, No. 5, The Royal Institute of Chemistry (London), page 14 (1957).